United States Patent [19]

Lindsey

[11] Patent Number: 4,744,652
[45] Date of Patent: May 17, 1988

[54] FOCUSING SYSTEM FOR A TRANSPARENCY PROJECTOR

[75] Inventor: Dwight W. Lindsey, Oysterbay, N.Y.

[73] Assignee: Schneider Corporation of America, Woodbury, N.Y.

[21] Appl. No.: 945,339

[22] Filed: Dec. 22, 1986

[51] Int. Cl.⁴ .............................................. G03B 21/14
[52] U.S. Cl. ...................................... 353/101; 250/250
[58] Field of Search ................ 353/100, 101; 350/243, 350/247, 254, 255, 257, 252

[56] References Cited

U.S. PATENT DOCUMENTS 4,266,855  5/1981  Mohr ............................... 353/101 X Primary Examiner—Harry N. Haroian
Attorney, Agent, or Firm—Karl F. Ross; Herbert Dubno

[57] ABSTRACT

A focusing system for slide projectors and the like in which the lens is mounted in a replaceable shift ring which can be selected from a set of such rings with different offsets between the lens axis and the projector axis. The ring can be assembly-affixed on a plate which can be clamped against the projector housing over the projection lens aperture thereof.

8 Claims, 2 Drawing Sheets

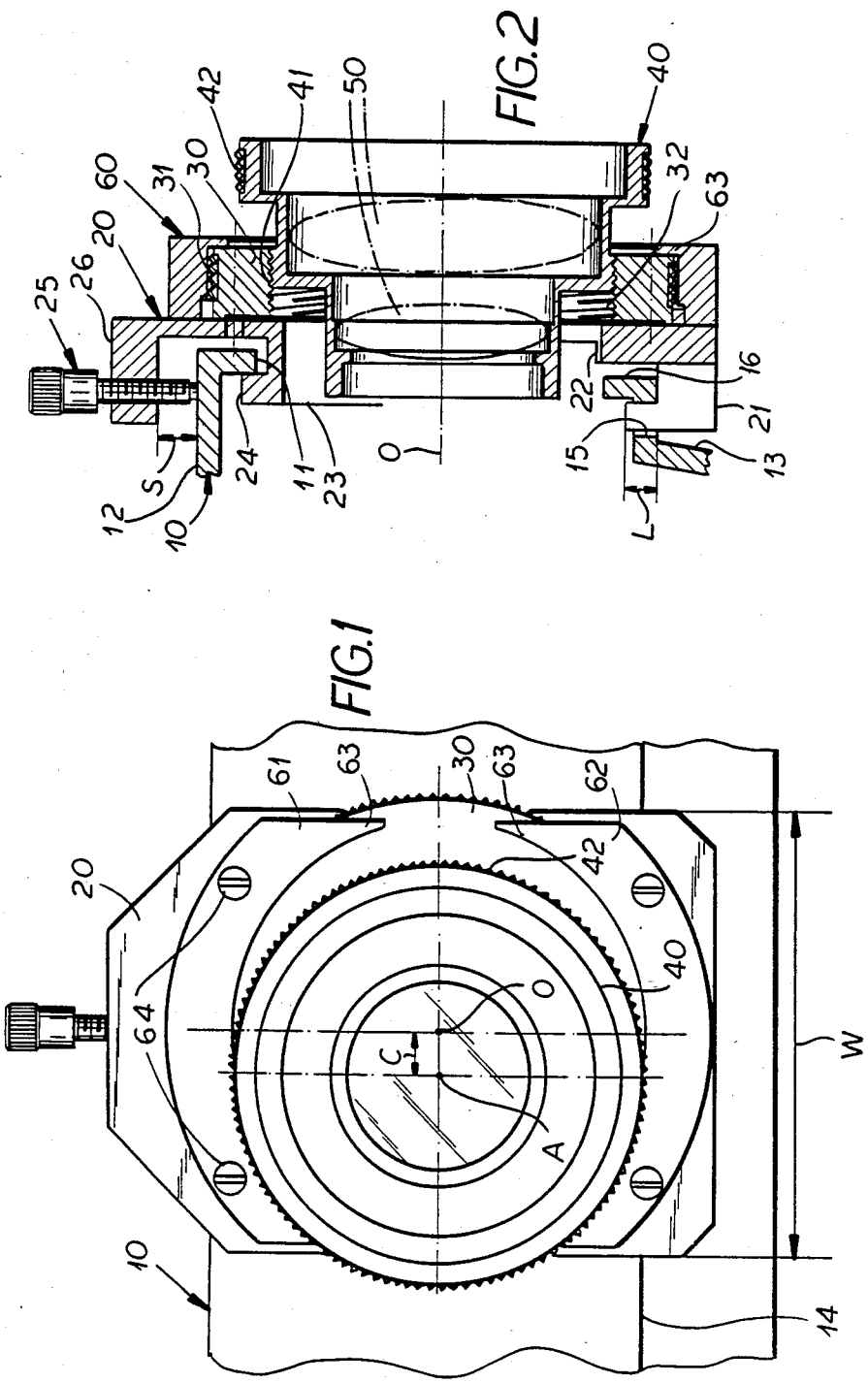

FOCUSING SYSTEM FOR A TRANSPARENCY PROJECTOR

FIELD OF THE INVENTION

The present invention relates to a focusing system for a transparency projector and, more particularly, to a projection lens system adapted to be used with an extension slide projector, namely the Ektagraphic III projector marketed by Kodak.

BACKGROUND OF THE INVENTION

A slide projector, through which an image of a transparency is projected on a screen, generally comprises a projection lens which can extend through an aperture in the casing or housing of the slide projector and is seated in a focusing system disposed internally of this housing. This applies also to the Ektagraphic III Kodak projector as it does to many modern slide projectors.

It is frequently desirable to substitute for the lenses applied with the projector other lenses of a variety of apertures or focal length, and even zoom lenses, while ensuring that even heavy lenses can be accommodated with stability and can be focused.

OBJECTS OF THE INVENTION

It is, therefore, the principal object of the present invention to provide a focusing or lens system for a transparency projector and particularly for the Ektagraphic III Kodak projector which will afford a high degree of focusing stability to enable even the longest and heaviest lenses to be fully supported and easily focused.

Another object of the invention is to provide an arrangement which can be mounted on an existing projector, which can accommodate lenses which are different from those usually provided with the projector, and which nevertheless ensures a high degree of mechanical stability in retaining the lens and allowing it to be focused or otherwise manipulated.

Still another object of the invention is to provide a focusing system for the aforedescribed purposes which allows an off-axis shift of the lens for keystone control and offset perspective control.

SUMMARY OF THE INVENTION

These objects and others which will become apparent hereinafter are attained, in accordance with the invention in a focusing system for the purposes described which comprises an adapter plate which can be mounted on the projector housing, casing or casting with mechanical stability over the lens aperture of that projection and is formed with an opening, an adaptor ring mounted on this plate and which can be replaceable thereon and can have its inner periphery disposed eccentrically with respect to its outer periphery to create a fixed offset between the optical axis of the aperture and the lens axis, and a projection lens having a stepped lens mount received in this ring and coupled therewith by a thread connection providing helical formations enabling focusing of the lens by rotation of the lens mount.

While the invention will be described in connection with the Ektagraphic III slide or transparency projector marketed by Kodak, it will be apparent that the principles thereof are equally applicable to the slide projectors in which alternative lens systems may be found to be useful and where, especially with long lenses, e.g. lenses having focal lengths up to 400 mm, it was almost impossible to stably position such lenses in the projector.

One of the advantages of the present invention is that the adapter plate fixed on the face of the casting overlying the lens aperture can support the lens closer to the front thereof than has been possible heretofore, thereby providing an effective mechanical support to allow especially long lenses to be accommodated.

According to the invention, the system can comprise a plate adapted to rest against the face of the projector housing formed with the projection lens aperture and provided with a lower formation engaging the housing or casting below this aperture, and a ledge overhanging the housing above the aperture.

The clamping means for holding the plate removably on the housing can comprise a screw threaded into this ledge and bearing upon a ledge of the housing which can overlie the aperture. Since the plate is braced between the lower formation and the screw on opposite sides of the housing, it is securely placed to provide the firm support previously described.

The projection lens can be contained in a conventional stepped-lens housing forming the axially stepped cylindrical mount described previously and carried by the plate. Important to the invention is the replaceable ring carried by the plate and interposed between the plate and the mount for positioning the mount on the plate.

According to an important principle of this invention, the ring is a selected member of a set whose centers of the respective inner peripheries, at which a mount can be engaged, have different offsets from the center of the respective outer periphery, thereby enabling, by selection of an appropriate ring, an off-axial shift of the lens with corresponding keystone or perspective control.

Advantageously, the outer periphery of the ring carried by the adapter plate and each ring of the set is milled or provided with ribs to enable the ring to be engaged by the fingers of a user so as to enable the offset axis to be rotated to the desired position about the projector axis.

The lens mount, barrel or housing can also be milled, knurled or otherwise provided with rib formations to enable displacement of the lens relative to the ring along the thread means for focusing purposes.

Furthermore, the ring may be held on the plate by a pair of arc-segmental retainers which can overhand the ring and can, in turn, be detachably affixed to the plate, e.g. by two screws each, to enable, with removal of at least one of the retainers, replacement of the respective ring.

BRIEF DESCRIPTION OF THE DRAWING

The above and other objects, features and advantages of the present invention will become more readily apparent from the following description, reference being made to the accompanying drawing in which:

FIG. 1 is a front elevational view of the focusing system in accordance with the present invention;

FIG. 2 is a vertical section through the unit of FIG. 1 showing its attachment to a projector housing or casing;

SPECIFIC DESCRIPTION

Figures 3A, 3B, 3C, 3D:
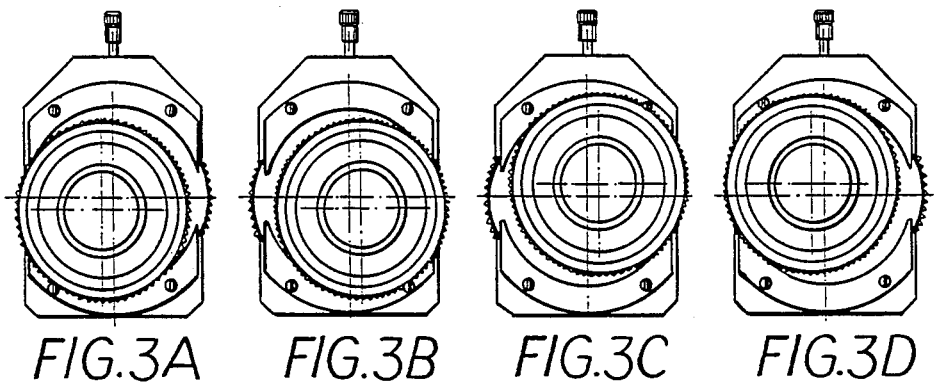
FIGS. 3A–3D are view similar to FIG. 1 showing different offset conditions which are possible, these Figures being drawn to a reduced scale.

Referring to FIGS. 1 and 2, it can be seen that the slide or transparency projector, e.g. Ektagraphic III projector of Kodak can comprise a housing or casing 10 which is formed with an aperture 11 referred to herein as the projector lens aperture and which is centered on an optical axis O of the projector. Above the aperture 11, the housing 10 is formed with an upper horizontal surface 12 while below the aperture, the housing can have a setback 13 defining a projecting portion 14 which is formed with at least one opening 15.

The focusing system of the present invention comprises a plate 20 which is adapted to overlie the aperture 11 along the face 16 of the housing and comprises one or more upwardly extending fingers 21 which can engage in the opening or openings 15 from below. The plate also has an opening 22 which can register with the aperture 11 and is defined on its upper boundary by an arcuate axially-projecting formation 23 defining a flange 24 which can engage behind the downwardly extending rim of the lens aperture 11 (see FIG. 2).

Clamping means in the form of a knurled-head screw 25 can be threaded into a ledge 26 of the plate 20 overhanging the surface 12 so that this screw can bear against the surface and draw the formations 21 and 24 upwardly into place.

The plate is thus held securely on the housing and is itself rigid although it may be removable by release of the screw. The spacing S between the ledge 26 and the surface 12 is preferably slightly larger than the length L by which the finger 21 projects into the opening 15.

Figure 4:
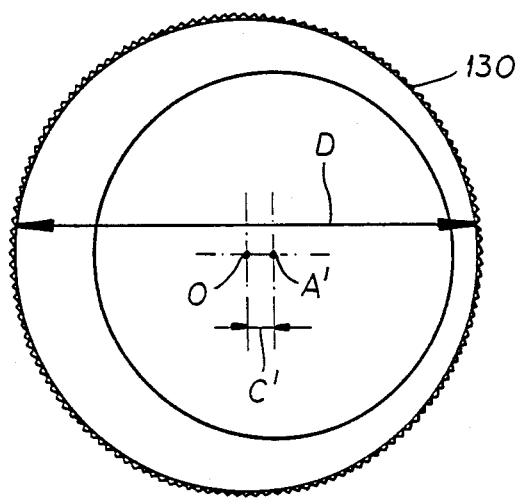
FIG. 4 is an elevational view showing a replaceable ring which can be substituted for that of FIGS. 1 and 2 but which has a smaller offset.

A selected ring 30 of a set of such rings, another of which is shown at 130 in FIG. 4, can be affixed to the plate 20. Each of the rings 30 is provided with a milled, or otherwise ribbed outer periphery 31 enabling the ring to be gripped and rotated relative to the plate.

The outer periphery of the ring can have a diameter D (FIG. 4) which is greater than the width W of the plate 20 so that, as is visible in FIGS. 1 and 3A–3D, a portion of this milled periphery will project beyond the plate to facilitate such gripping.

The inner periphery of the ring 30 is formed at 32 with a threaded formation cooperating with a complementary thread formation 41 on a lens mount or housing 40 differing for the various lenses which may be provided but in general constituted as a stepped cylindrical member at least one peripheral surface 42 of which is milled, knurled or ribbed to permit rotation of the lens mount 40 and thus axial displacement thereof relative to the ring because of the helical thread connection 41, 32 therebetween.

In the illustration of FIGS. 1 and 2, the projection lens is shown to be a multi-element lens diagrammatically made up of two menisci 50 solely for illustrative or diagrammatic purposes, it being evident that the particular lens configuration which may be used will depend upon the aperture, the focal length and the types of correction desired. Within the purview of the invention, the lens may be a short-barrel lens as has been illustrated, a long-barrel fixed-focus lens or even a long-barrel zoom lens, the length of the lens barrel or mount varying depending upon the particular lens system which is selected.

The ring 30 is held against the plate 20 by a fastening system 60 constituted by a pair of arc-segmental retainers 61, 62, each of which has a flange 63 partly overhanging the ring 30 and is removably affixed to the plate by a pair of screws 64. It will be apparent that by removal of at least one of these retainers, the ring 30 can be replaced by another ring, e.g. the ring 130 of the set to control the keystone effect or the perspective which is produced by reason of the offset of the lens axis A from the optical axis O of the projector. The degree of offset is seen in FIG. 1 to be C and to be greater than the degree of offset between the lens axis A' and the optical axis O for the ring 130 in FIG. 4 where this offset is shown at C'.

For any selected ring, for which offsets up to 7 mm can be provided, the orientation of the offset lens axis can be varied by rotating the ring before it is fixed in place by the retaining segments so that, as for example shown in FIG. 3A, the offset axis can lie in the lower left quadrant, or as seen in FIG. 3B in the lower right quadrant, or as seen in FIG. 3C in the upper right quadrant, or as seen in FIG. 3D in the upper left quadrant. Naturally between these positions, there are an infinite number of other positions that the ring may assume.

The shift ring allows the lens to be shifted off axis, therefore, to any desired degree of orientation to provide effective control of keystone. In addition to allowing the off-axis shift of the lens for keystone control, the system provides very smooth and stable focus even for very long lenses.

What is claimed is:

1. A focusing system for a projector having a projector housing formed with a projection lens aperture, said focusing system comprising:
    an adapter formed with a plate adapted to rest against said housing over said aperture and provided with a lower formation engaging in said housing below said aperture and a ledge overhanging said housing above said aperture;
    clamping means on said ledge for bracing said ledge against said housing to releasably retain said plate rigidly thereon, said plate being formed with an opening registering with said aperture;
    an axially stepped cylindrical mount carried by said plate;
    a replaceable ring carried by said plate and interposed between said plate and said mount for positioning said mount on said plate; and
    a projection lens received in said mount and having a focus adjustable therein relative to said projector.

2. The focusing system defined in claim 1 wherein said ring is a selected ring of a set having centers of respective inner peripheries offset from the center of the respective outer periphery by different magnitudes of offset, thereby enabling, with ring selection, an off-axial shift of said lens with corresponding keystone control.

3. The focusing system defined in claim 2 wherein said clamping means includes a screw threaded into said ledge and adapted to bear upon said housing.

4. The focusing system defined in claim 3, further comprising helical thread means interconnecting said ring and said mount for enabling axial movement of said mount and said lens relative to said plate upon rotation of said mount.

5. The focusing system defined in claim 4 wherein said mount has an outer peripheral surface lying forwardly of said ring and provided with ribs facilitating gripping of said mount for rotation thereof relative to said ring.

6. The focusing system defined in claim 4 wherein said ring has a ribbed outer peripheral surface projecting beyond said plate at least at one side thereof, enabling rotation of said ring relative to said plate.

7. The focusing system defined in claim 6 wherein said adapter further comprises a pair of arc-segmental retainers removably affixed to said plate and overhanging said ring above and below said opening.

8. The focusing system defined in claim 7 wherein each of said arc-segmental retainers is held by two screws to said plate.

* * * * *